United States Patent [19]
Thro et al.

[11] Patent Number: 6,147,977
[45] Date of Patent: Nov. 14, 2000

[54] METHOD AND APPARATUS FOR PROCESSING MESSAGES BASED ON ORIGINATOR AND RECIPIENT PRIORITIES

[75] Inventors: Stuart W. Thro, Cary; Alex P. Hirsbrunner, Bloomingdale; Sewim Fewsi Ablay, West Dundee, all of Ill.

[73] Assignee: Motorola, Inc., Schaumburg, Ill.

[21] Appl. No.: 08/991,104

[22] Filed: Dec. 12, 1997

[51] Int. Cl.[7] ............................. H04L 12/16; H04J 3/12
[52] U.S. Cl. ........................................ 370/265; 370/264
[58] Field of Search .................................. 379/201, 88.09, 379/88.12, 106.02, 208; 370/264, 265, 259

[56] References Cited

U.S. PATENT DOCUMENTS

| | | | |
|---|---|---|---|
| 5,033,077 | 7/1991 | Bergeron et al. | 379/67 |
| 5,153,905 | 10/1992 | Bergeron et al. | 379/201 |
| 5,457,732 | 10/1995 | Goldberg | 379/57 |
| 5,544,229 | 8/1996 | Creswell et al. | 379/67 |
| 5,933,477 | 8/1999 | Wu | 379/88.26 |

Primary Examiner—Hassan Kizou
Assistant Examiner—Hanh Nguyen
Attorney, Agent, or Firm—Steven R. Santema

[57] ABSTRACT

A method and apparatus that process messages within a wireless communications system based on originator priority and recipient priority is accomplished when a server (12, 52) receives a message from an originating party (50). The message includes identity of the receiving party (54), originator priority information, and message content. Upon identifying the receiving party, the server retrieves recipient priority information of the receiving party. The server then merges the originator priority information with the recipient priority information to produce a message priority. In addition, the server generates a recipient index, which identifies an address for subsequent retrieval of the message content. Next, the server provides notice of the message to the receiving party based on the message priority. The notice of the message may be sent to the receiving party's pager, cellular telephone, e-mail account, facsimile machine, wireline telephone, or answering service.

30 Claims, 5 Drawing Sheets

METHOD AND APPARATUS FOR PROCESSING MESSAGES BASED ON ORIGINATOR AND RECIPIENT PRIORITIES

TECHNICAL FIELD OF THE INVENTION

This invention relates generally to communication systems and, more particularly, to a method and apparatus for processing messages within the communication systems based on originator and recipient priorities.

BACKGROUND OF THE INVENTION

Wireless communication systems are known to include a plurality of subscriber units and supporting wireless infrastructure. The supporting wireless infrastructure includes system controllers, site controllers, base station controllers, base stations, and a plurality of wireless communication channels. At each site of the wireless communication system, a site controller manages a plurality of base station controllers and each of the base station controllers manages a plurality of base stations. Each of the base stations supports a set of the wireless communication channels. The set of wireless communication channels support control information (e.g. inbound signaling words and outbound signaling words), voice communications, and data communications. Typically, one of the set of wireless communication channels is designated as a control channel that supports the control information, while the other channels support the voice and/or data communications. The subscriber units of the wireless communication system include land mobile radios, portable radios, cellular telephones, pagers, personal digital assistants having RF (radio frequency) transceiver(s), personal computers having a wireless modem, wireless facsimile, or any other devices that communicate data via a wireless communication path. Each of the subscriber units is capable of initiating a wireless communication service and receiving wireless communication services. For example, a subscriber unit may be a targeted recipient of a facsimile, a cellular telephone call, a page, a data transmission, or a combination of such communications. When a subscriber unit receives the notification of an incoming call, the operator of the subscriber unit has no idea as to the content of the message, and, in most cases, has no indication of the identity of the originating party. Note that some digital wireless subscriber units are equipped with caller I.D., which provides the operator of the receiving subscriber unit an indication of the originating party, but still does not provide an indication as to the content of the communication.

Depending on the frequency of incoming calls, it can be quite enjoyable to receive a call if called infrequently, or it can be down right annoying if called too frequently. For an operator of a subscriber unit that is called too frequently, the operator has the choice of simply not answering his or her phone. But this all-or-nothing approach may cause the operator to miss important calls. Caller I.D. provides the telephone number of the originating party, but this information is only helpful if the operator knows the originating party well enough to know his or her number. In many business communications, operators of the subscriber units only occasionally know the telephone number of the originating business party. For example, assume that the operator of a subscriber unit is a doctor who works at a large hospital. In a normal day, the doctor receives dozens of communications per hour either via his or her pager, cellular telephone or other wireless device. While some of the incoming calls may be important requiring the doctor's immediate attention, there are many less urgent communications that can wait. However, is until the doctor answers the call, he or she does not know whether the call was urgent, whether it could have waited, or whether someone else (nurse, office personnel, etc.) could have handled it.

Another solution for reducing the number of incoming calls is to forward the calls to another telephone. In call forwarding, all calls targeting the subscriber unit will be forwarded to the other telephone. While this reduces the number of incoming calls, it is an all-or-nothing approach, thus delaying the receipt of important calls. Yet another method for controlling incoming calls is disclosed in U.S. Pat. No. 5,457,732 entitled "Method and Apparatus for Delivery of a Response in a Messaging System" issued to Steven J. Goldberg and assigned to Motorola, Inc. The '732 patent teaches a method and apparatus for efficiently delivering responses to designated messaging terminals. The delivery of a data or a voice response is delivered in the manner preferred by the user of the messaging terminal which receives the response, and without delivering intrusive data signals to the user's handset during the delivery of the response call. While this technique allows the user to establish some priority as to which calls it will receive, it does not take into account priorities placed upon incoming messages by the originator of the messages.

Therefore, a need exists for a method and apparatus that allows for processing of messages based on originator priority and recipient priority.

DETAILED DESCRIPTION OF A PREFERRED EMBODIMENT

Generally, the present invention provides a method and apparatus that processes messages within a wireless communications system based on originator priority and recipient priority. This is accomplished in the wireless communication system when a server receives a message from an originating party, where the message includes identity of the receiving party, the identity of the originating party, originator priority information, message content, originator location, request for acknowledgement upon receipt and/or a request for acknowledgement of message understanding. Upon identifying the receiving party, the server retrieves recipient priority information of the receiving party. The server then merges the originator priority information with the recipient priority information to produce a message priority. In addition, the server generates a recipient index, which identifies an address for subsequent retrieval of the message content and for optional use as a reference identifier for returning an acknowledgment of understanding to the originator party. Next, the server attempts to provide notice of the message to the receiving party based on the message priority. The notice of the message may be sent to the receiving party's pager, cellular telephone, e-mail account, facsimile machine, wireline telephone, and/or answering service. In the event the receiving party is not available, the notice is stored in a database for later delivery, or forwarded to a surrogate of the receiving party.

When the receiving party retrieves the message, his subscriber unit or other terminal device provides a receipt acknowledgment signal to the server. The server then processes the acknowledgment signal and sends it to the originating party such that the originating party knows that the receiving party has received the message. In addition, the receiving party may provide an acknowledgment of understanding signal through his subscriber unit or other terminal device to the server. The server processes this acknowledgment signal and routes it to the originating party.

By providing the originating party with an acknowledgment of understanding, the originating party knows that, not only has the receiving party's subscriber unit or terminal device received the message, but that the receiving party has attested that he understood it as well. With such a method and apparatus, messages within a wireless communication system are presented to a receiving party based on priorities established by the receiving party and by the originating party. In addition, the originating party receives acknowledgments that the receiving party has received the message and that the receiving party has understood the message. By having a message processing system operate in this manner, receiving parties are only receiving messages that are deemed important by both the receiving party and the originating party.

Figure 1:
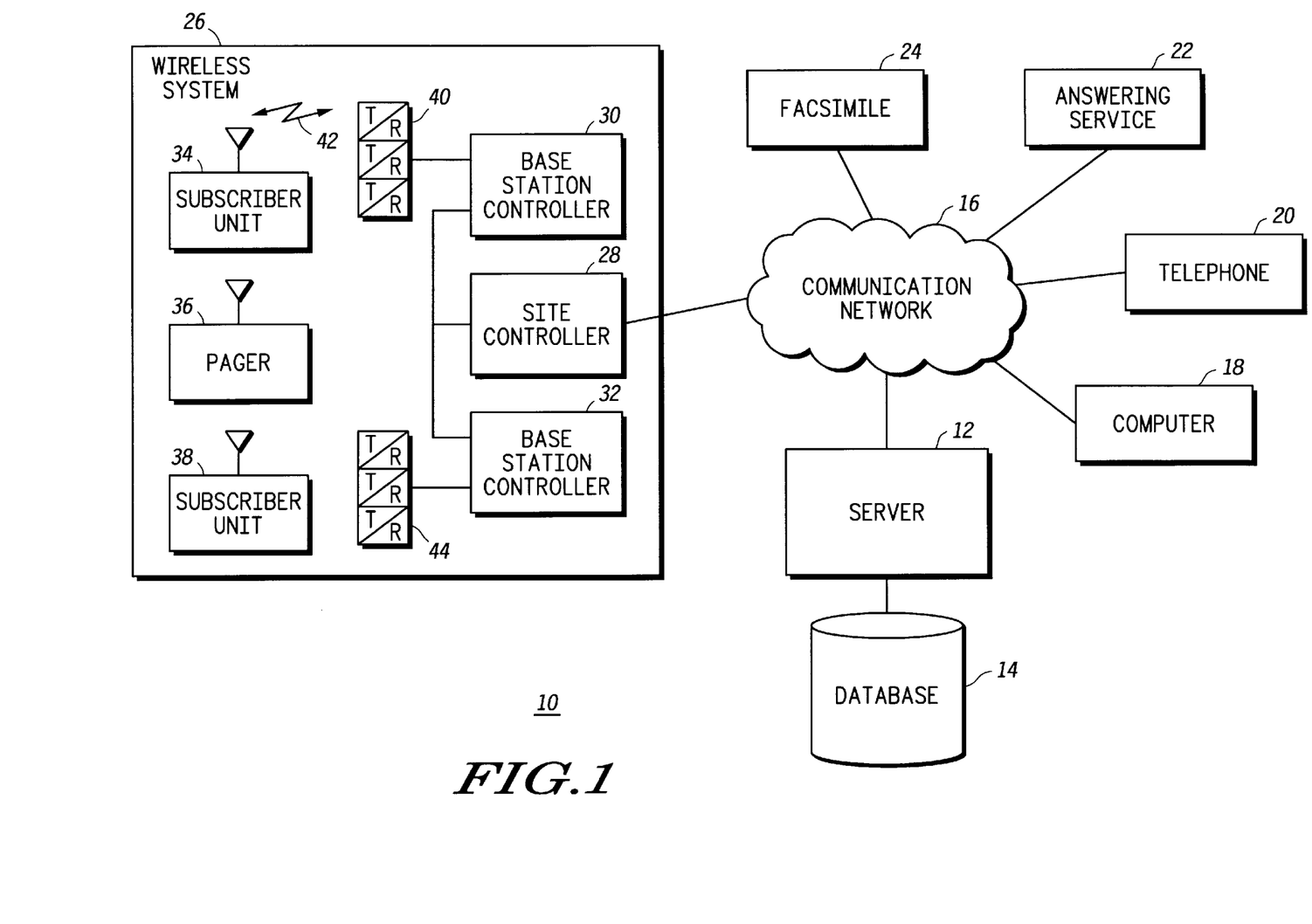
FIG. 1 illustrates a block diagram of a communication system in accordance with the present invention.

The present invention can be more fully described with reference to FIGS. 1 through 5. FIG. 1 illustrates a block diagram of a communications system 10 that includes a server 12, a database 14, a communication network 16 (e.g. Internet, Public Switch Telephone Network), a computer 18, a telephone 20, an answering service 22, a facsimile machine 24, and a wireless system 26. The wireless system 26 includes a site controller 28, a plurality of base station controllers 30, 32, base stations 40, 44, wireless communication channels 42, and a plurality of subscriber units 34, 36 and 38. The subscriber unit 34, 36, 38 may be land mobile radios, portable radios, cellular telephones, pagers, personal digital assistants with wireless modems, personal computers with wireless modems, or any other device that communicates data via the wireless communication channels 42.

In the communication system 10, the receiving user of a subscriber unit 34–38, other terminal device 18, 20 or 24, or answering service 22 establishes a priority matrix wherein the server 12 filters any incoming call directed to that user based on the priority matrix. As such, the user of a subscribing unit, or terminal device, can establish a priority matrix such that certain calls are sent, for example, to its facsimile machine 24, to its answering service 22, to its wireline telephone 20, to its computer 18 via an e-mail account, to its pager, or to its cellular telephone, or to another subscriber unit 34–38 having facsimile, telephony, computer, or paging capability. (Note that the facsimile machine 24 or computer 18 could be connected to communication network 16 using either a wireline or wireless connection.) The priority is matrix of each receiving party is stored in the database 14 and processed by the server 12.

The priority matrix of each receiving party or user includes either a receiving user rule set for interpreting specific originator priority levels or a system developed rule set for interpreting originator priority levels (i.e., a default priority rule set established by the system 10). As such, the priority level requested by the originating party will be factored into the receiving user's priority matrix to determine how and where the notice of message should be sent. Prompting the originating party for entry of the originating party priority level may be done by any of a number of methods and user interfaces, such as a telephony auto-attendant, or other methods as are well-known in the art. Thus, messages transmitted within the wireless communication system 10 are processed based not only on the priority matrix established by the receiving party but also based on the priority requested by the originating party.

If the originator or receiving location is provided by the communication system, this information is also processed by the rule set to determine how and where the notice of message should be sent (e.g. a physician in an operating theater may desire messages of certain priorities to be held until he is no longer in the current location). In addition, when a subscriber unit has received its message, it provides an acknowledgment signal, which the server provides back to the originating party such that the originating party knows that its message has been received. Further, the communication system 10 allows subscriber units 34–38 or wireline terminal destinations 18–24, to provide an acknowledgment of understanding of the message, which the server 12 processes and provides to the originating party. By processing messages in this manner, is receiving parties are not inundated with a plurality of less important messages. The receiving party can establish his or her priority matrix such that only high priority communications are provided to him or her and others are sent to other communication devices for later retrieval or for processing by others. In addition, the receiving party may establish its priority matrix based on the time of day, day of week, etc., such that incoming messages will be routed differently depending on the time of day. Day of week routing is advantageous when a receiving party has a dramatically different schedule on particular day(s), and may also entail a different messaging terminal for receiving messages.

Figure 2:
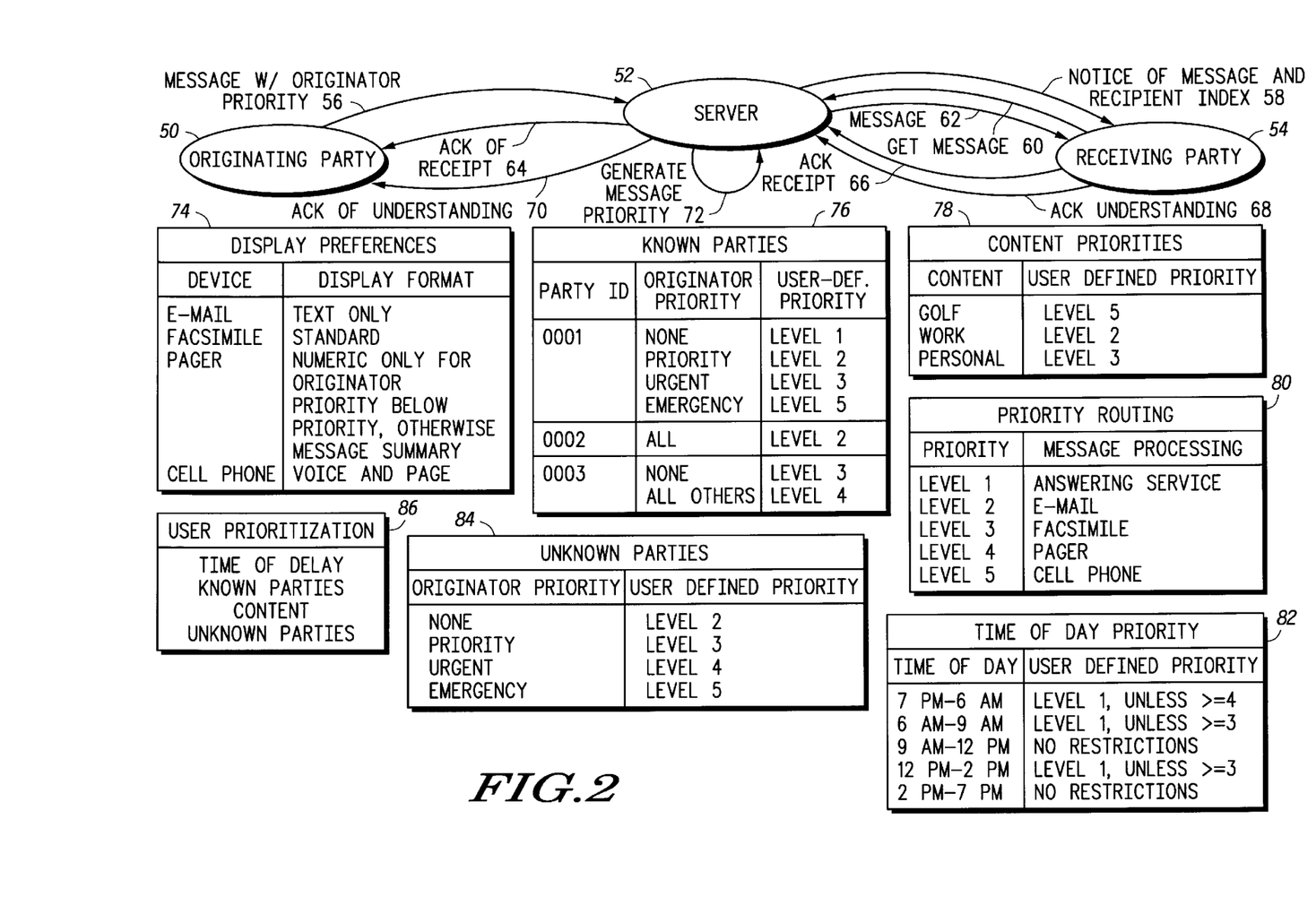
FIG. 2 illustrates a state diagram that includes the originating party, a server, and a receiving party transmitting messages in accordance with the present invention.

FIG. 2 illustrates a state diagram of message processing between the originating party 50, the server 52, and the receiving party 54. The message processing begins when the originating party 50 transmits a message 56 to the server 52. The message transmitted includes the identity of the originating party, the requested originator priority, identity of the receiving party, and message content. The server 52 upon receiving the message 56 determines, based on the priority matrix of the receiving party that includes the originator priority, where and how a notice of message and a recipient index 58 are to be sent. Note that the recipient index is an address or an index which the receiving party will subsequently use to retrieve the message content from the server, or to reference an acknowledgement of understanding being returned to the originator. The notice of message not only informs the receiving party that it has a message but provides an indication as to the content of message. The content of the message is determined by reviewing the message for descriptive words, similar to those in table 78, which can be recognized by voice recognition, text scans, etc.

The server uses the tables of FIG. 2 to establish the recipient priority or the priority matrix. The tables, which collectively constitute the priority matrix, include display preferences 74, known parties 76, content priority 78, priority routing 80, time of day priority 82, unknown parties 84, and user prioritization 86. The display preferences table 74 includes a field for devices and a field for display format. As shown for illustration purposes, the receiving party has an e-mail account, a facsimile machine, a pager, and a cellular telephone. For notices of messages, or message contents, that are to be sent to the e-mail account, the illustration shows that the user has selected that the notice of message, or the message content, should only be displayed in text format. As one of average skill in the art will readily appreciate, the user just as easily could have selected that incoming messages or notice of messages be displayed in other computer formats, such as a spreadsheet, word processing document, an image document, or an HTML (HyperText Markup Language) document.

As further illustrated, the receiving user has selected that notice of messages, or messages, sent to the facsimile machine are to be displayed in a standard facsimile format. For notice of messages, and messages, that are to be sent to the pager, the receiving user has selected a numeric display for messages that have an originator priority below a "priority level" (see table 76 for a ranking of originator priority levels). The user has further selected that notice of messages for messages having an originator priority above the priority level should be displayed as message summaries (e.g. alphanumeric display, graphic display, short messaging display, etc.). The receiving user has selected that for notice of messages, and messages, that are to be sent to the user's cellular telephone, these are to be displayed as a page, or voice.

The known parties table 76 has three fields: one for the originating party's identification, the requested originator's priority, and the recipient's priority established by this rules set. For this example, the originator priority has been established to be one of four priority levels, which include "none", "priority", "urgent", and "emergency". The illustration shows three originating parties with the identities of 0001, 0002, and 0003. The user has selected that, for originating party 0001 calls, an originator priority of "none" will be treated as a receiving user defined priority of level 1. For party 0001 calls having an originator priority of "priority" will be interpreted as a receiving user defined priority level 2, calls having an originator priority of "urgent" will have a user defined priority level 3 and calls having an originator priority of "emergency" will have a user defined priority level 5. All calls from party 0002 will be interpreted as a receiving user defined priority of level 2. For calls from party 0003, originator priority of "none" will be interpreted as a receiving user defined priority of level 3, while all other calls will have a user defined priority of level 4.

The server, after analyzing the content of incoming messages, uses the content priority table 78 to establish the content-based recipient priority level of the message. The content priority table 78 includes a field for content and another for recipient user-defined priority. In the example shown, messages relating to "golf" have a user defined priority of level 5, while "work" topics have a user defined priority of level 2, and "personal" matters have a user defined priority of level 3.

The priority routing table 80 includes two fields, one for the priority and the second for message processing. As the illustration shows, notice of messages, and/or messages, having a user defined priority of level 1 are to be routed to the recipient's answering service. Notice of messages, and/or messages, having a user defined priority of level 2 are to be routed to the recipient's e-mail account. Notice of messages, and/or messages, having a user defined priority of level 3 are to be routed to the recipient's facsimile machine. Notice of messages, and/or messages, having a user defined priority of level 4 are to be routed to the recipient's pager and level 5 notice of messages, and/or messages are to be routed to the recipient's cellular telephone.

The time of day priority table 82 includes two fields, one for the time of day and the other for user-defined priorities. For notice of messages and/or messages received between 7:00 p.m. and 6:00 a.m., the user-defined priority is established to be level 1 unless the message has an originator priority equating to a user defined priority of level 4 or above, then the user defined priority is level 4. For notice of messages and/or messages received between 6:00 a.m. and 9:00 a.m. or received during 12:00 p.m. and 2:00 p.m., the user defined priority is level one unless the message has an originator priority equating to a user defined priority of level 3 or above, then the user defined priority is level 3. For notice of messages and/or messages received between 9:00 a.m. and 12:00 p.m. or between and received between 2:00 p.m. and 7:00 p.m., the user has placed no restrictions on the incoming messages and notice of messages.

The unknown parties table 84 includes two fields, one for originator priority and the other for user-defined priority. For an unknown caller, i.e., the receiving party does not have an entry in its known party table 76, all non-priority messages will be treated as level 2, "priority" messages will be treated as level 3, "urgent" messages as level 4, and "emergency" messages as level 5.

The receiving user defined prioritization table 86 establishes a priority order for the other tables. The illustration shows the time of day priority table 82 as having the highest priority followed by known parties table 76, the content table 78, and unknown parties 84. The message priority is then determined 72 from these tables based on a simple equation, an average of priorities, a weighted average of priorities, or other methods for converging multiple values into a single representative value. For example, assume that the receiving party 54 is to receive a priority message having an originator priority of "priority" from the originating party identified as 0001. Further assume that the content of the particular message is related to golf and is received at 10:30 a.m. The server 52 utilizes the tables (i.e., the priority matrix or recipient priority tables) to generate a message priority for the incoming message. As illustrated in the user prioritization table 86, the time of day table 82 has the highest priority. Since this message was received at 10:30 a.m., the user-defined priorities have no restrictions. As such, the next entry in the priority table is accessed. In the illustration, the next entry is the known parties table 76. Since the originating party is known (party 0001) and the originator priority is known (priority), the server retrieves the user defined priority of level 2. At this point, under one message priority generation process, the server would use the level 2 priority for this message and route it to the user's e-mail account. As can be seen from this example, the message priority may be established based on the priority level established in the highest priority table.

As an alternate example of generating the message priority 72, assume the same information as above (i.e., party 0001, originator priority of "priority", content is "golf", and received at 10:30 a.m.). In this example, the message priority is determined as a weighted average, where the weighting values are arbitrarily chosen from the prioritization table 86. In this example the weighting values are 4 for time of day, 3 for known parties, 2 for content, and 1 for unknown parties. As such, the user defined priority from time of day table is essentially level 0, thus it will not be used in the equation. The priority from the known party table 76 is level 2 and the priority from the content table is level 5. Given these values, the message priority equals $(2*2+1*5)/(2+1)=3$. Therefore, the weighted average is level 3 such that the message and/or notice thereof will be sent to the user's facsimile machine.

As another example of generating the message priority, the highest priority in any of the tables would be used as the message priority. Using the same assumptions as above, the user defined priority level for a message containing a subject of golf is level 5. Thus, the message priority would be level 5. As such, the message would be routed to the user's cellular telephone. As those having ordinary skill in the art will readily appreciate, any number of priority tables may be used to establish the priority matrix. Note that the tables of FIG. 2 are included for illustrative purposes and, as those having ordinary skill in the art will readily appreciate, there may be more or less tables used as identified priority parameters to establish the priority matrix as well as more or less entries within each priority table. Additionally, the number of priorities of the originator priority may very greatly from the four discussed.

As one of average skill in the art will further note, messages are not only prioritized for delivery to a specific device, but are sent to single device in a prioritized fashion such that the system is not operating in a FIFO (first-in-first-out) mode. For example, assume 3 originators accessing the system at the same time, the first leaving a low priority message, the second leaving a high priority and a third leaving a medium priority message, all for the same receiving party. If the receiving party has specified that at the current time, all messages go to his cellular telephone, then the messages will be delivered such that the highest priority message is delivered first. Further note that the final output of the system is not only a routing to a specific device based on a priority level. For example, a member of a NHTSA Go-Team responsible for investigating aircraft crashes may want any message with the content "scramble" to be simultaneously delivered to all of the devices listed in priority routing table 80. This is accomplished by varying the order in which the priority tables are processed. In its most general form the inputs to the rules matrix are: originator priority; receiving party priority; originating device; time of day/day of week/day of year; message content; originator location; and receiving party location. The outputs are generated in the form: time of delivery; device choice; message content (may be filtered/truncated or converted to the appropriate media); message priority relative to other messages bound for current device choice; and message priority relative to all other messages.

Note that when a message cannot be promptly delivered, new rules may be in effect at the time that delivery can be effected. This implies that all of the original inputs should be stored for subsequent processing. In the preferred implementation, information is processed through the priority tables in an order specified by the receiving party. Further note that the server stores a plurality of tables for each receiving party 54 which it utilizes to generate the priority matrix for the receiving party. Alternatively, the server may store a plurality of tables, which it uses to generate the priority matrix for a group of receiving parties. Still further, the server may dynamically generate the known party and unknown party priority tables depending on the identity of the particular originating party. For example, if the system is used in a hospital, any message originated by the Chief of Staff, would be given a high priority message and routed directly to the receiving party. Alternatively, if the message is originated by the janitorial service, the message may receive a lower priority. In addition, unknown parties such as labs, or other testing facilities, may receive high-priority such that doctors can be provided with information relating to lab work or other medical testing information.

Returning to the state diagram portion of FIG. 2, once the server has identified the device, it will send the notice of message by accessing the display preference table 74. Having determined the displaying preference, the server routes the notice of message and a recipient index, or the message, to the receiving party. Once the receiving party 54 receives the notice of message and the recipient index 58, the receiving party makes a request to get the message 60. The request includes the recipient index and may be sent immediately upon receiving the notice or at any time thereafter. Upon receiving the request for the message from the receiving party 60, the server provides 62 the message to the receiving party 54. Upon receiving the message, the receiving party generates an acknowledgment receipt, which is provided 66 to the server. The server 52 then provides 64 an acknowledgment of receipt to the originating party. At some later point, the receiving party 54 provides 68 an acknowledgment of understanding to the server, using the recipient index to link this acknowledgment to the original message. The server then provides 70 a similar acknowledgment of understanding to the originating party.

Figure 3:
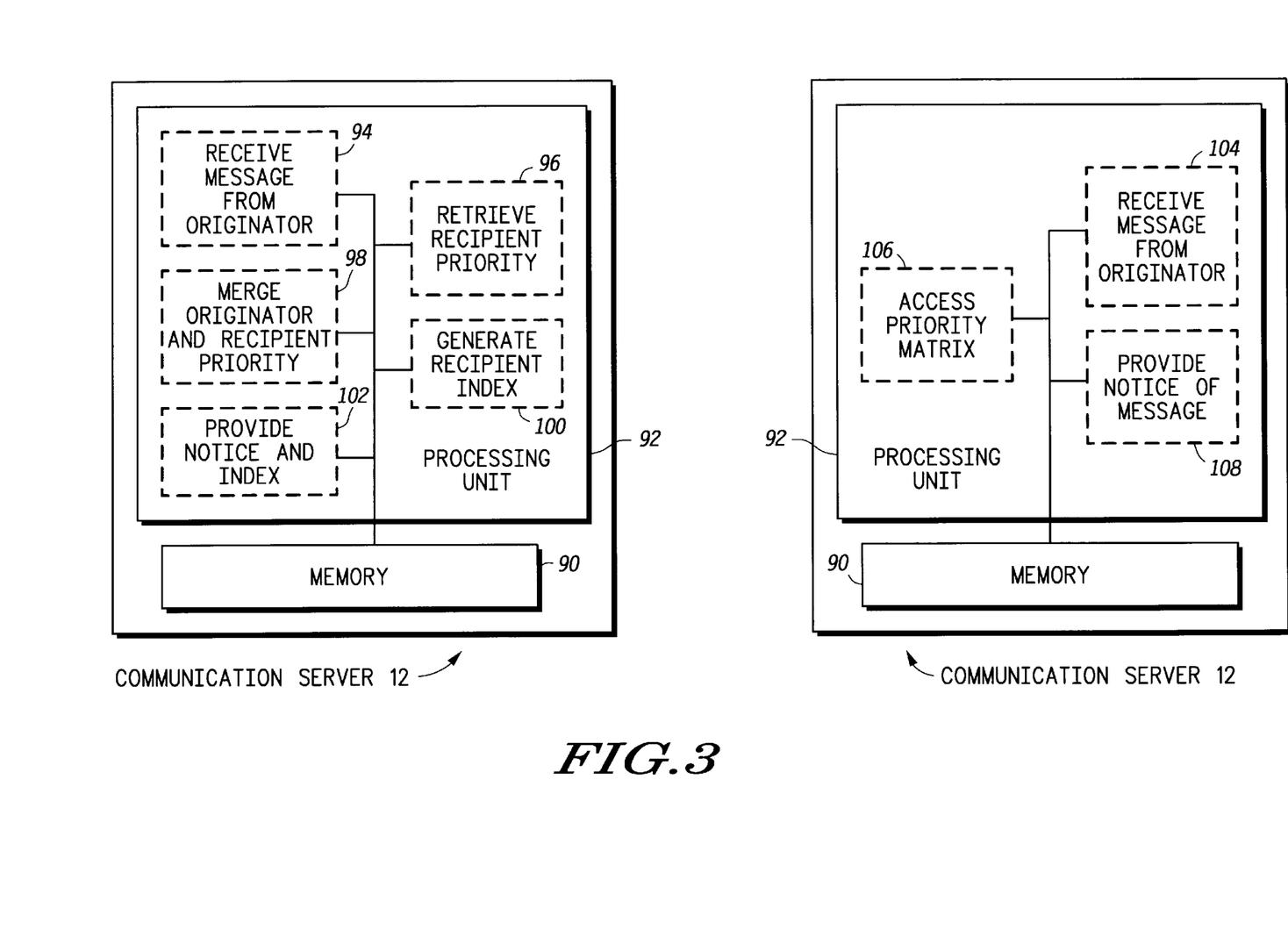
FIG. 3 illustrates two schematic block diagrams of the communication server in accordance with the present invention.

FIG. 3 illustrates two schematic block diagrams of the communications server 12, 52. In both embodiments, the server 12, 52 includes a processing unit 92 and memory 90. The memory 90, which may be read-only memory, random access memory, floppy disk memory, hard disk memory, CD ROM memory, DVD ROM memory, or any other device for storing digital information, stores programming instructions. The processing unit 92, which may be a microprocessor, microcontroller, digital signal processor, central processing unit or any other device that manipulates digital information based on programming instructions, executes the programming instructions stored in memory 90 to function as a plurality of circuits.

In the communication server 12 on the left side of the page, the processing unit 92, while executing the programming instructions stored in memory 90, functions as a circuit 94 to receive a message from an originating party. Next, the processing unit 92 functions as a circuit 96 to retrieve recipient priority information, or priority matrix. Next, the processing unit 92 functions as a circuit 98 to merge the originator priority and the recipient priority to produce a message priority. The processing unit 92 then functions as a circuit 100 to generate a recipient index such that the recipient party may subsequently retrieve the message.

Finally, the processing unit 92 functions as a circuit 102 to provide notice of message and the recipient index to the receiving party.

The communications server 12 on the right side of the page includes a processing unit 92 and memory 90. While the processing unit 92 is executing the programming instructions stored in the memory 90, it functions as a circuit 104 to receive a message from an originating party. The processing unit 92 then functions as a circuit 106 to access a priority matrix. Having accessed the priority matrix, the processing unit 92 functions as a circuit 108 to provide the message (including the message content) to the receiving party. The functionality of both communication servers will be discussed in greater detail with reference to FIGS. 4 and 5.

Figure 4:
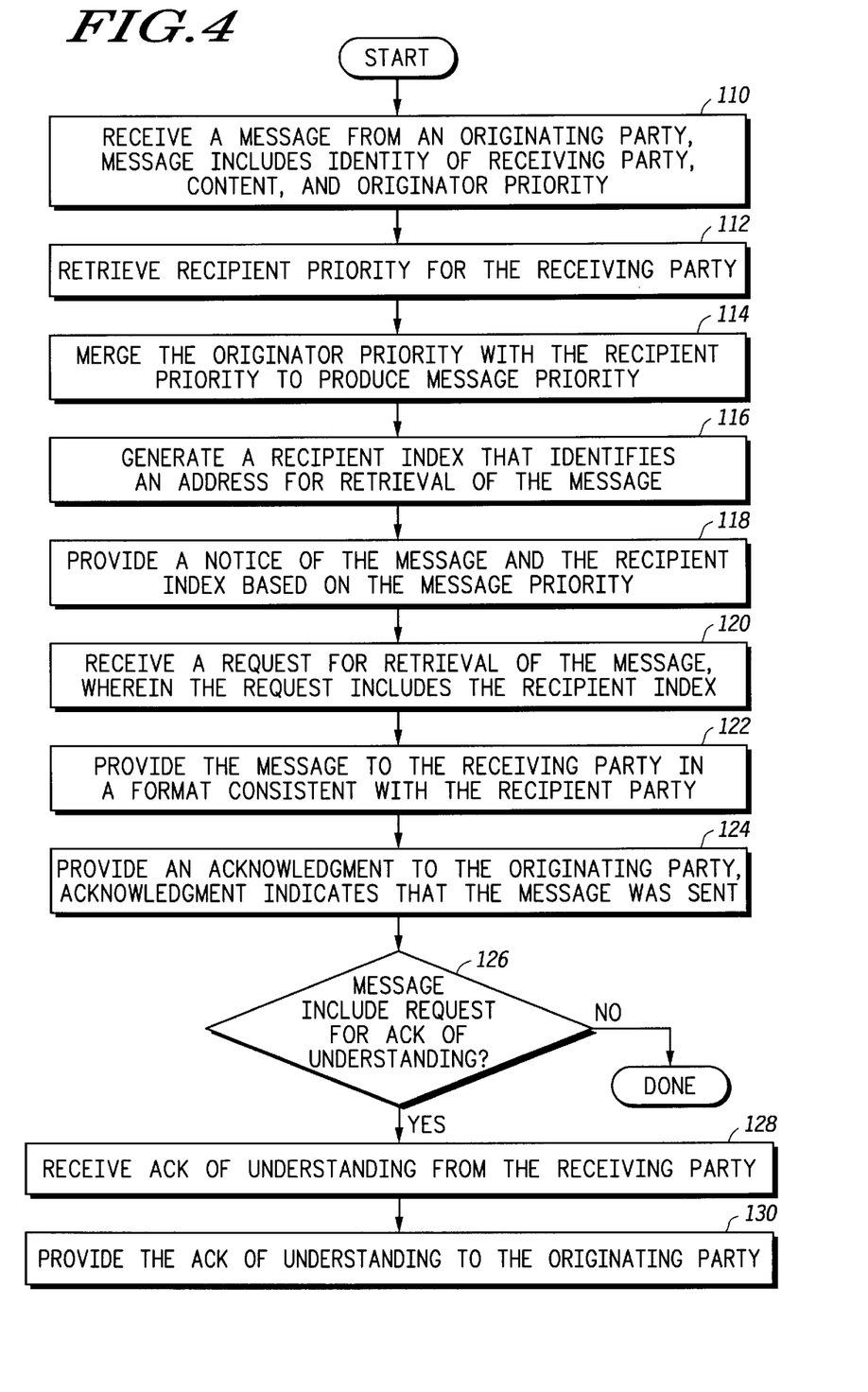
FIG. 4 illustrates a flow chart of a method for processing messages in accordance with the present invention.

FIG. 4 illustrates a flow chart of a method for processing messages based on originator priority and recipient priority. The process begins at step 110 where the server receives a message from an originating party. The message includes identity of the receiving party, message content, the identity of the originating party, and the originator priority. The message may further include a request for acknowledgment of message receipt and/or a request for acknowledgment of message understanding. The process proceeds to step 112 where a server retrieves recipient priority for the receiving party. As described with reference to FIG. 2, the recipient priority is based on a priority matrix, which the server generates from a plurality of priority tables.

The process then proceeds to step 114 where the server merges the originator priority with the recipient priority to produce a message priority. Such merging was discussed with reference to FIG. 2. The process then proceeds to step 116 where the server generates a recipient index that identifies an address for retrieval of the message content. The recipient index will be used subsequently by the receiving party to retrieve the message content. The process then proceeds to step 118 where the server provides a notice of the message and the recipient index to a communication device of the receiving party based on the message priority. As discussed with reference to FIG. 2, the message may be routed to any one of the plurality of communication devices of the receiving party.

The process then proceeds to step 120 where the server receives a request for a retrieval of the message from the receiving party. The request includes the recipient index such that the server knows which message to retrieve. Note that the receiving party and the originating party refer to communication devices operated by users, which may be people or machines.

The process then proceeds to step 122 where the server provides the message to the receiving party in a format consistent with the recipient priority. As mentioned with reference to FIG. 2, the receiving party may establish display parameters such that, based on the device the message is to be displayed on, the server will provide the information in a consistent format. Having done this, the process proceeds to step 124 where the server provides an acknowledgment of receipt to the originating party. The acknowledgment indicates that the message was sent to the receiving party and/or indicates that the receiving party received the message.

The process then proceeds to step 126 where a determination is made as to whether the message sent from the originating party includes a request for an acknowledgment of understanding. If not, the process is complete for this particular message. If, however, the originator's message includes a request for acknowledgment of understanding the process proceeds to step 128. At step 128, the receiving party will subsequently be prompted to provide an acknowledgment of understanding to the server after the message has been read and understood. This acknowledgment of understanding response will include the recipient index to link this acknowledgment to the original message, or the content of the original message. The process then proceeds to step 130 where the server provides the acknowledgment of understanding to the originating party. After step 130, the process is complete for this particular message. With the server processing messages in this manner, the recipient's priority, as well as the originator's priority factor into how the messages will be processed. In addition, the originator can request acknowledgment of receipt and acknowledgment of understanding of its message. As such, the receiving party is not inundated with low priority messages during critical times of his or her day or inundated with messages that do not require immediate attention and the originating party may receive acknowledgements that its message has been received and understood.

Figure 5:
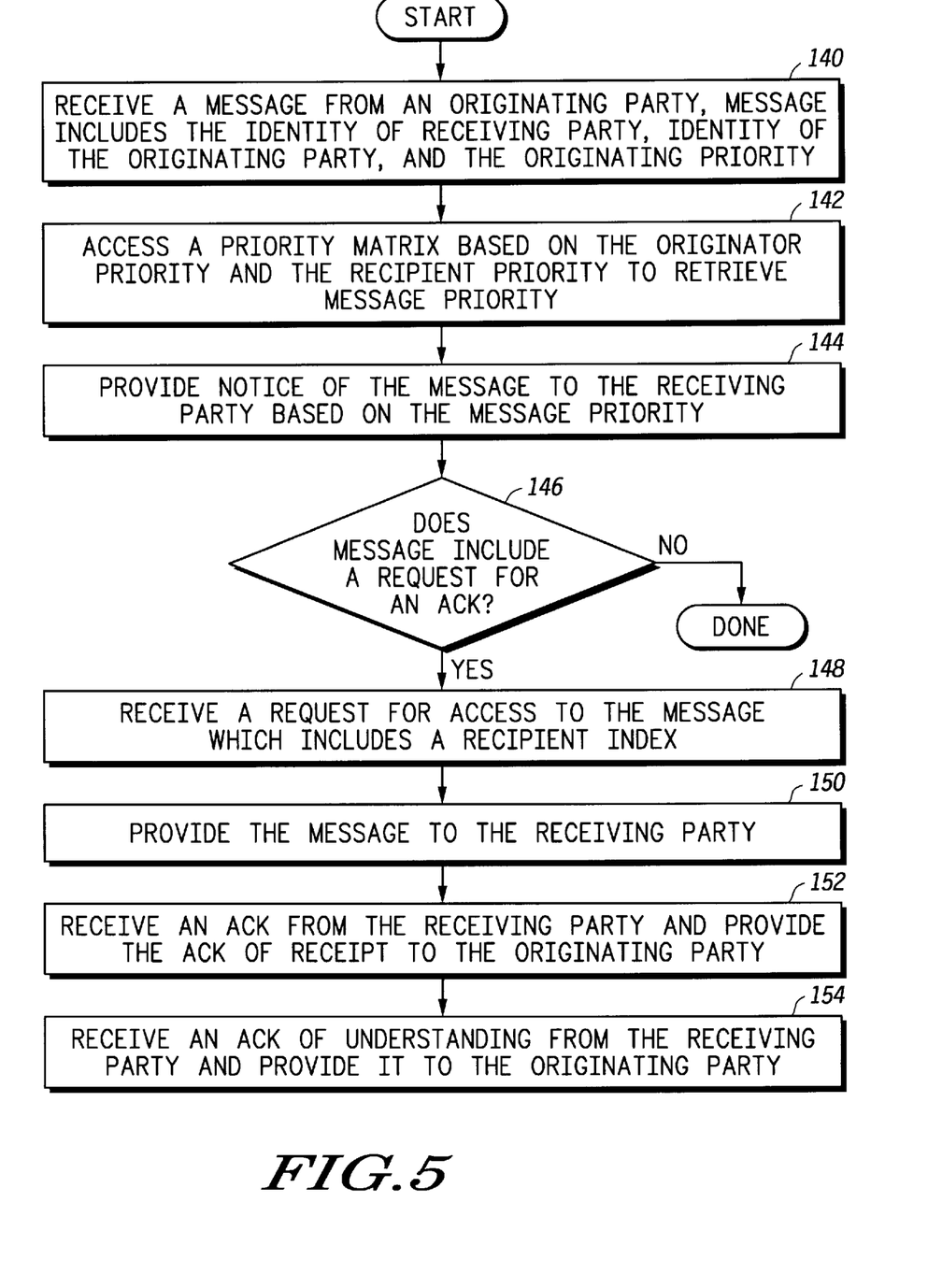
FIG. 5 illustrates a flow chart of an alternate method for processing messages in accordance with the present invention.

FIG. 5 illustrates a flow chart of an alternate method for processing messages. The process begins at step 140 where the server receives a message from an originating party. The message includes the identity of the receiving party, identity of the originating party, the originator priority, and message content. The process then proceeds to step 142 where the server accesses a priority matrix based on the originator priority and the recipient priority to retrieve a message priority. The process then proceeds to step 144 where the server generates a recipient index that identifies an address for possible use in an acknowledgement of understanding and provides the message to the receiving party based on the message priority.

The process then proceeds to step 146 where a determination is made as to whether the originator's message includes a request for acknowledgment. If not, the process is complete for this particular message. If, however, the message includes a request for acknowledgment, the process proceeds to step 152. At step 152 the server receives an acknowledgment from the receiving party and subsequently provides it to the originating party. The process then proceeds to step 154 where the server receives an acknowledgment of understanding from the receiving party and subsequently provides it to the originating party. At this point, the process is complete for this particular message.

The preceding discussion has presented a method and apparatus that processes messages in a wireless communications system based on the originator priority and the receiving party's priority. In addition, the present invention allows for acknowledgments of not only receipt of messages, but acknowledgements of understanding as well. As such, receiving parties are not inundated with messages that are of low priority, which could be responded to at a later time, but are provided with high-priority messages not only determined by themselves, but by the originating party.

We claim:

1. A method for processing a message based on originator priority and recipient priority, the method comprising the steps of:

a) receiving a message from an originating party, wherein the message includes an identity of a receiving party, content, and the originator priority;

b) retrieving the recipient priority of the receiving party;

c) merging the originator priority and the recipient priority to produce a message priority;

d) generating a recipient index that identifies an address for retrieval of the message; and e) providing, based on the message priority, notice of the message and the recipient index to the receiving party.

2. The method of claim 1, wherein step (a) further comprises receiving the message that further includes a request for acknowledgment of message receipt.

3. The method of claim 2 further comprising:

receiving a request for retrieval of the message, wherein the request includes the recipient index;

providing the message to the receiving party in a format consistent with the recipient priority; and providing an acknowledgment to the originating party, wherein the acknowledgment indicates that the message was sent to the receiving party.

4. The method of claim 1, wherein step (a) further comprises receiving the message that further includes a request for acknowledgment of message understanding.

5. The method of claim 4 further comprising:

receiving a request for retrieval of the message, wherein the request includes the recipient index;

providing the message to the receiving party;

receiving an acknowledgment of understanding; and providing a representation of the acknowledgment of understanding to the originating party.

6. The method of claim 1, wherein step (b) further comprises retrieving the recipient priority to include at least one of: a priority matrix, recipient device types, recipient device capabilities, and presentation options.

7. The method of claim 6, wherein step (c) further comprises:

identifying at least one of: the originating party, content of the message, and time of day to produce identified priority parameters; and determining the message priority from the priority matrix based on the identified priority parameters.

8. A method for processing a message based on originator priority and recipient priority, the method comprising the steps of:

a) receiving a message from an originating party, wherein the message includes identity of the receiving party, identity of an originating party, and the originator priority;

b) accessing a priority matrix based on the originator priority and the recipient priority of the receiving party to retrieve a message priority; and c) providing the message to the receiving party based on the message priority.

9. The method of claim 8, wherein step (c) further comprises providing a recipient index that identifies an address for returning an acknowledgment of understanding.

10. The method of claim 9, wherein step (a) further comprises receiving the message that includes a request for at least one of: acknowledgment of receipt of the message and acknowledgment of understanding of the message.

11. The method of claim 10 further comprising providing the acknowledgment of receipt of the message to the originating party.

12. The method of claim 11 further comprising:

receiving an indication of understanding from the receiving party; and providing the acknowledgment of understanding to the originating party.

13. The method of claim 8, wherein step c) further comprises providing the message to include priority of the message.

14. A communication server comprising:

a processing unit; and a memory operably coupled to the processing unit, wherein the memory stores programming instructions that, when read by the processing unit, causes the processing unit to: (a) receive a message from an originating party, wherein the message includes an identity of a receiving party, content, and the originator priority; (b) retrieve the recipient priority of the receiving party; (c) merge the originator priority and the recipient priority to produce a message priority; (d) generate a recipient index that identifies an address for retrieval of the message; and (e) provide, based on the message priority, notice of the message and the recipient index to the receiving party.

15. The communication server of claim 14, wherein the memory further comprises programming instructions that, when read by the processing unit, causes the processing unit to receive the message that includes a request for acknowledgment of message receipt.

16. The communication server of claim 14, wherein the memory further comprises programming instructions that, when read by the processing unit, causes the processing unit to:

receive a request for retrieval of the message, wherein the request includes the recipient index;

provide the message to the receiving party in a format consistent with the recipient priority; and provide an acknowledgment to the originating party, wherein the acknowledgment indicates that the message was sent to the receiving party.

17. The communication server of claim 14, wherein the memory further comprises programming instructions that, when read by the processing unit, causes the processing unit to:

receive the message that includes a request for acknowledgment of message understanding;

receive a request for retrieval of the message, wherein the request includes the recipient index;

provide the message to the receiving party in a format consistent with the recipient priority;

receive an acknowledgment of understanding; and provide a representation of the acknowledgment of understanding to the originating party.

18. The communication server of claim 14, wherein the memory further comprises programming instructions that, when read by the processing unit, causes the processing unit to retrieve the recipient priority to include at least one of: priority matrix, recipient device types, recipient device capabilities, and presentation options.

19. A communication server comprising:

a processing unit; and a memory operably coupled to the processing unit, wherein the memory stores programming instructions that, when read by the processing unit, causes the processing unit to: (a) receive a message from an originating party, wherein the message includes identity of the receiving party, identity of an originating party, and the originator priority; (b) access a priority matrix based on the originator priority and the recipient priority of the receiving party to retrieve a message priority; and (c) provide the message to the receiving party based on the message priority.

20. The communication server of claim 19, wherein the memory further comprises programming instructions that, when read by the processing unit, causes the processing unit to provide a recipient index that identifies an address for returning an acknowledgment of understanding.

21. The communication server of claim 20, wherein the memory further comprises programming instructions that, when read by the processing unit, causes the processing unit to receive the message that includes a request for at least one of: acknowledgment of receipt of the message and acknowledgment of understanding of the message.

22. The communication server of claim 21, wherein the memory further comprises programming instructions that, when read by the processing unit, causes the processing unit to provide the acknowledgment of receipt of the message to the originating party.

23. The communication server of claim 22, wherein the memory further comprises programming instructions that, when read by the processing unit, causes the processing unit to:

receive an indication of understanding from the receiving party; and provide the acknowledgment of understanding to the originating party.

24. The communication server of claim 19, wherein the memory further comprises programming instructions that, when read by the processing unit, causes the processing unit to provide the message to include priority of the message.

25. A method comprising the steps of:

receiving, by a communication server, a first message from an originating party, wherein the first message includes an identity of a receiving party, content, and an originator priority;

retrieving a recipient priority of the receiving party;

merging the originator priority and the recipient priority to produce a message priority of the first message;

determining, based on the message priority of the first message, a selected terminal device from among a plurality of terminal devices associated with the receiving party; and sending, by the communication server, a second message to the selected terminal device.

26. The method of claim 25 wherein the step of sending the second message comprises sending a notice of the first message to the selected terminal device.

27. The method of claim 25 wherein the step of sending the second message comprises forwarding the first message to the selected terminal device.

28. The method of claim 25 wherein the step of sending the second message comprises sending an address for retrieval of the message to the selected terminal device.

29. The method of claim 25, wherein the step of merging the originator priority and the recipient priority to produce a message priority comprises determining the message priority from among multiple priority levels.

30. The method of claim 25, wherein the step of sending the second message comprises sending the second message, via one of a plurality of communication networks, to the selected terminal device.

* * * * *